US012665632B2

(12) United States Patent (10) Patent No.: US 12,665,632 B2

Lin et al. (45) Date of Patent: Jun. 23, 2026

(54) GENERATING METHOD AND GENERATING SYSTEM OF WIDEBAND RECONFIGURABLE INTELLIGENT SURFACE

(71) Applicant: NATIONAL CHUNG CHENG UNIVERSITY, Chiayi (TW)

(72) Inventors: Shih-Cheng Lin, Taitung County (TW); Sheng-Fuh Chang, Chiayi County (TW); Chia-Chan Chang, Chiayi City (TW); Yuan-Chun Lin, Hsinchu County (TW); Ting-Hao Shih, Tainan City (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 84 days.

(21) Appl. No.: 18/961,481

(22) Filed: Nov. 27, 2024

(65) Prior Publication Data

US 2026/0051929 A1 Feb. 19, 2026

(30) Foreign Application Priority Data

Aug. 16, 2024 (TW) .................................. 113130961

(51) Int. Cl.
 *H01Q 15/14* (2006.01)
 *H04B 7/04* (2017.01)
(52) U.S. Cl.
 CPC .............................. *H04B 7/04013* (2023.05)

(58) Field of Classification Search
 CPC ...... H01Q 15/00; H01Q 15/14; H01Q 15/148; H01Q 1/38; H01Q 1/48; H01Q 1/50;
 (Continued)

(56) References Cited

U.S. PATENT DOCUMENTS 11,431,103 B2 * 8/2022 Baligh ............... H01Q 21/0018
11,843,171 B2 * 12/2023 Saab ................... H04B 7/04013
 (Continued)

FOREIGN PATENT DOCUMENTS

CN 117793754 A 3/2024

*Primary Examiner* — Tho G Phan

(74) *Attorney, Agent, or Firm* — CKC & Partners Co., LLC

(57) ABSTRACT

A generating method and a generating system of a wideband reconfigurable intelligent surface are proposed. The generating method includes executing an electromagnetic simulation software to generate a plurality of reconfigurable reflective units, and simulating the reconfigurable reflective units to obtain a plurality of reflection characteristic simulation values corresponding to a plurality of metal patterns; calculating the reflection characteristic simulation values according to an adaptability function to obtain a plurality of adaptability values corresponding to the metal patterns; calculating the adaptability values according to an optimization algorithm to obtain an optimized adaptability value, wherein the optimal adaptability value corresponds to an optimized metal pattern data; and importing the optimized metal pattern data into the electromagnetic simulation software to generate a plurality of optimized reconfigurable reflective units and forming the wideband reconfigurable intelligent surface based on the optimized reconfigurable reflective units.

18 Claims, 15 Drawing Sheets

(58) Field of Classification Search
    CPC .......... H01Q 19/10; H01Q 21/06; H04B 7/04;
                                            H04B 7/04013
    See application file for complete search history.

(56)                    References Cited

U.S. PATENT DOCUMENTS

| | | | |
|---|---|---|---|
| 12,381,616 B2 * | 8/2025 | Alkhateeb ............ | H01Q 19/104 |
| 12,444,851 B2 * | 10/2025 | Rafique ................ | H01Q 15/148 |
| 12,476,363 B2 * | 11/2025 | Omiya .................. | H04B 7/0413 |
| 12,525,725 B2 * | 1/2026 | Khaira .................... | H01Q 3/46 |
| 12,526,013 B1 * | 1/2026 | Lin .................... | H04B 7/04013 |
| 12,580,611 B2 * | 3/2026 | Ye ...................... | H04B 7/04013 |
| 2022/0059943 A1 | 2/2022 | Saab et al. | |

* cited by examiner

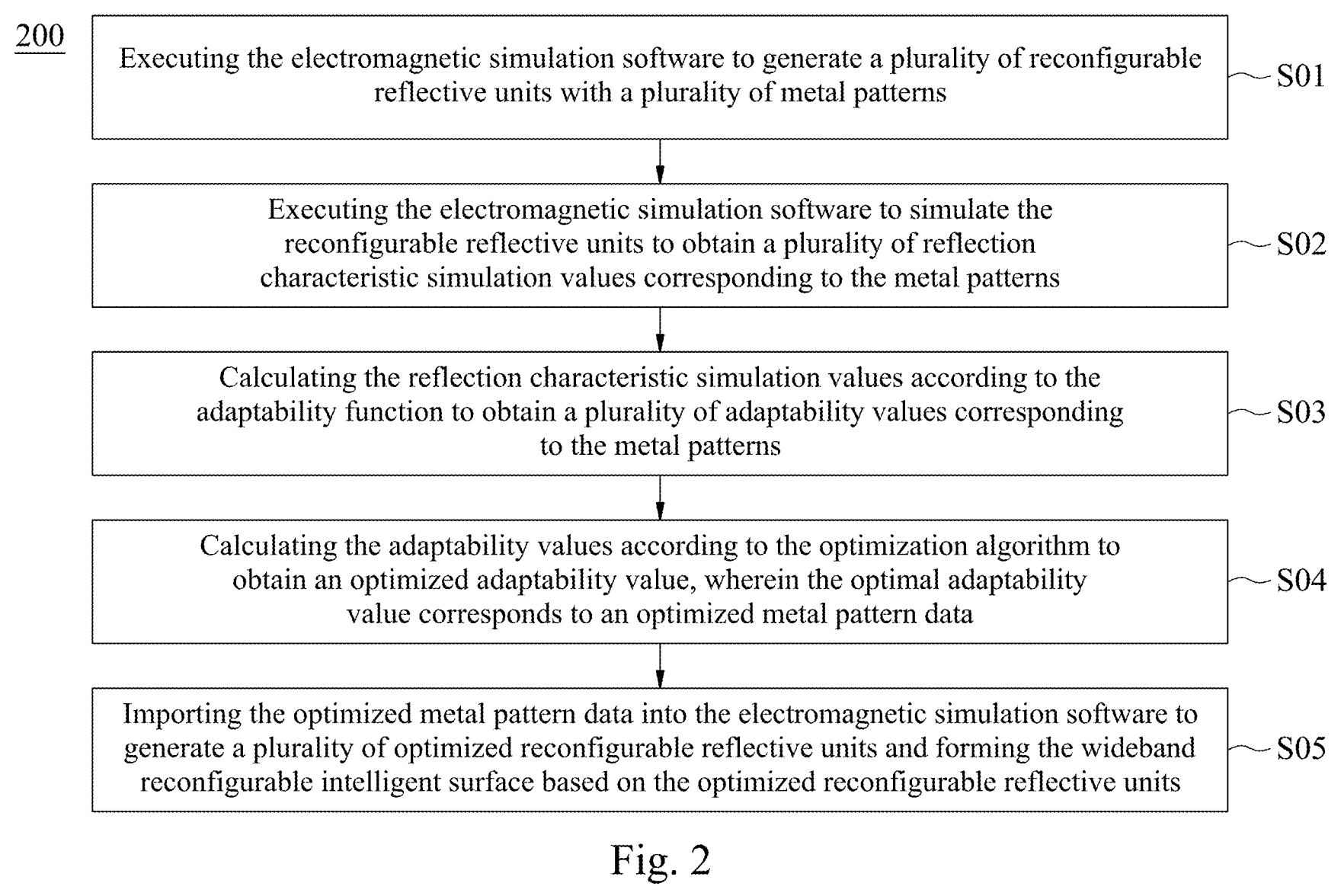

200

S01 — Executing the electromagnetic simulation software to generate a plurality of reconfigurable reflective units with a plurality of metal patterns S02 — Executing the electromagnetic simulation software to simulate the reconfigurable reflective units to obtain a plurality of reflection characteristic simulation values corresponding to the metal patterns S03 — Calculating the reflection characteristic simulation values according to the adaptability function to obtain a plurality of adaptability values corresponding to the metal patterns S04 — Calculating the adaptability values according to the optimization algorithm to obtain an optimized adaptability value, wherein the optimal adaptability value corresponds to an optimized metal pattern data S05 — Importing the optimized metal pattern data into the electromagnetic simulation software to generate a plurality of optimized reconfigurable reflective units and forming the wideband reconfigurable intelligent surface based on the optimized reconfigurable reflective units

Fig. 2

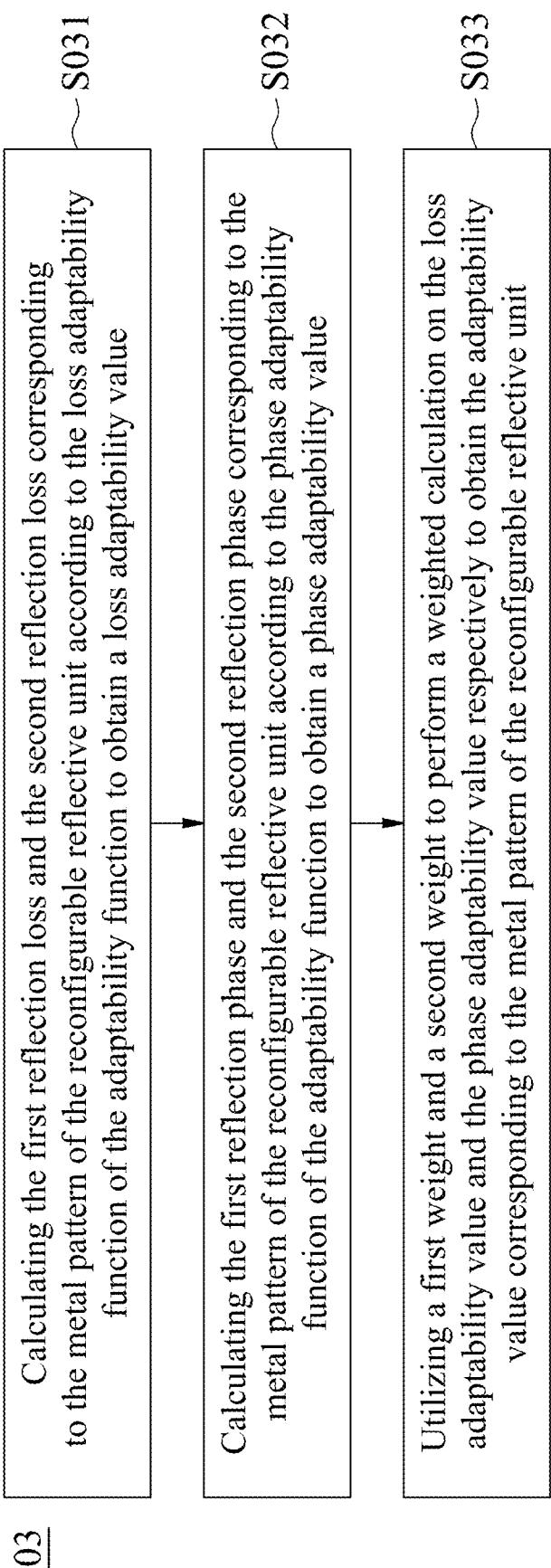

S03

S031 — Calculating the first reflection loss and the second reflection loss corresponding to the metal pattern of the reconfigurable reflective unit according to the loss adaptability function of the adaptability function to obtain a loss adaptability value S032 — Calculating the first reflection phase and the second reflection phase corresponding to the metal pattern of the reconfigurable reflective unit according to the phase adaptability function of the adaptability function to obtain a phase adaptability value S033 — Utilizing a first weight and a second weight to perform a weighted calculation on the loss adaptability value and the phase adaptability value respectively to obtain the adaptability value corresponding to the metal pattern of the reconfigurable reflective unit

S041 Initializing the adaptability values according to the optimization algorithm, initializing an initial decreasing parameter and two initial iteration parameters of the optimization algorithm, and setting a maximum number of iterations S042 Executing an optimizing procedure according to the optimization algorithm

GENERATING METHOD AND GENERATING SYSTEM OF WIDEBAND RECONFIGURABLE INTELLIGENT SURFACE

RELATED APPLICATIONS

This application claims priority to Taiwan Application Serial Number 113130961, filed Aug. 16, 2024, which is herein incorporated by reference.

BACKGROUND

Technical Field

The present disclosure relates to a generating method and a generating system of a reconfigurable intelligent surface. More particularly, the present disclosure relates to a generating method and a generating system of a wideband reconfigurable intelligent surface based on an optimization algorithm.

Description of Related Art

In mobile communication technologies, in order to improve transmission efficiency and system throughput and optimize the transmission quality of communication networks, more and more spectrum resources are used in the millimeter wave (mmWave) band. Although the mmWave band has a higher operating frequency, mmWave signals have larger path losses in the communication environment. In addition, the penetration and bypass capabilities of the mmWave signals are pretty limited, so the mmWave signals are easily blocked by environmental buildings to form communication blind zones. In order to solve the above problems, reconfigurable intelligent surface (RIS) is gradually emerging. RIS is a general term for a special surface that can change the propagation characteristics of electromagnetic waves and is composed of multiple passive units. By adjusting the amplitude and phase of each passive unit in RIS, the propagation of electromagnetic waves can be adjusted to achieve the effect of controlling the electromagnetic environment.

Although the current RIS uses varactors as adjustable components, and operating them under reverse bias can significantly reduce power consumption. However, due to the nonlinear changing characteristics, varactors can only be operated within a specific bias voltage range and cannot meet the capacitance values required by the internal unit of RIS at different frequencies, resulting in a narrow operating bandwidth. On the other hand, the reflection loss of the current RIS has poor performance and is generally higher than 3 dB, and the excessive reflection loss causes the disadvantages of energy leakage and rising sidelobe level (SLL). In view of this, how to generate a reconfigurable intelligent surface with broadband and low reflection loss has become an urgent problem that related industries want to solve currently.

SUMMARY

According to one aspect of the present disclosure, a generating method of a wideband reconfigurable intelligent surface includes executing an electromagnetic simulation software to generate a plurality of reconfigurable reflective units with a plurality of metal patterns by a processor; executing the electromagnetic simulation software to simulate the reconfigurable reflective units to obtain a plurality of reflection characteristic simulation values corresponding to the metal patterns by the processor; calculating the reflection characteristic simulation values according to an adaptability function to obtain a plurality of adaptability values corresponding to the metal patterns by the processor; calculating the adaptability values according to an optimization algorithm to obtain an optimized adaptability value by the processor, wherein the optimal adaptability value corresponds to an optimized metal pattern data; and importing the optimized metal pattern data into the electromagnetic simulation software to generate a plurality of optimized reconfigurable reflective units and forming the wideband reconfigurable intelligent surface based on the optimized reconfigurable reflective units by the processor, wherein the optimized reconfigurable reflective units are the same as each other.

According to another aspect of the present disclosure, a generating system of a wideband reconfigurable intelligent surface includes a memory and a processor. The memory stores an electromagnetic simulation software, an adaptability function and an optimization algorithm. The processor is electrically connected to the memory and implements a generating method of the wideband reconfigurable intelligent surface including executing the electromagnetic simulation software to generate a plurality of reconfigurable reflective units with a plurality of metal patterns by the processor; executing the electromagnetic simulation software to simulate the reconfigurable reflective units to obtain a plurality of reflection characteristic simulation values corresponding to the metal patterns by the processor; calculating the reflection characteristic simulation values according to the adaptability function to obtain a plurality of adaptability values corresponding to the metal patterns by the processor; calculating the adaptability values according to the optimization algorithm to obtain an optimized adaptability value by the processor, wherein the optimal adaptability value corresponds to an optimized metal pattern data; and importing the optimized metal pattern data into the electromagnetic simulation software to generate a plurality of optimized reconfigurable reflective units and forming the wideband reconfigurable intelligent surface based on the optimized reconfigurable reflective units by the processor, wherein the optimized reconfigurable reflective units are the same as each other.

BRIEF DESCRIPTION OF THE DRAWINGS

The present disclosure can be more fully understood by reading the following detailed description of the embodiment, with reference made to the accompanying drawings as follows:

FIG. 2 is a flow chart of a generating method of the wideband reconfigurable intelligent surface according to a second embodiment of the present disclosure.

FIG. 6 is a flow chart of a step of obtaining a plurality of adaptability values in FIG. 2.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected" to another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
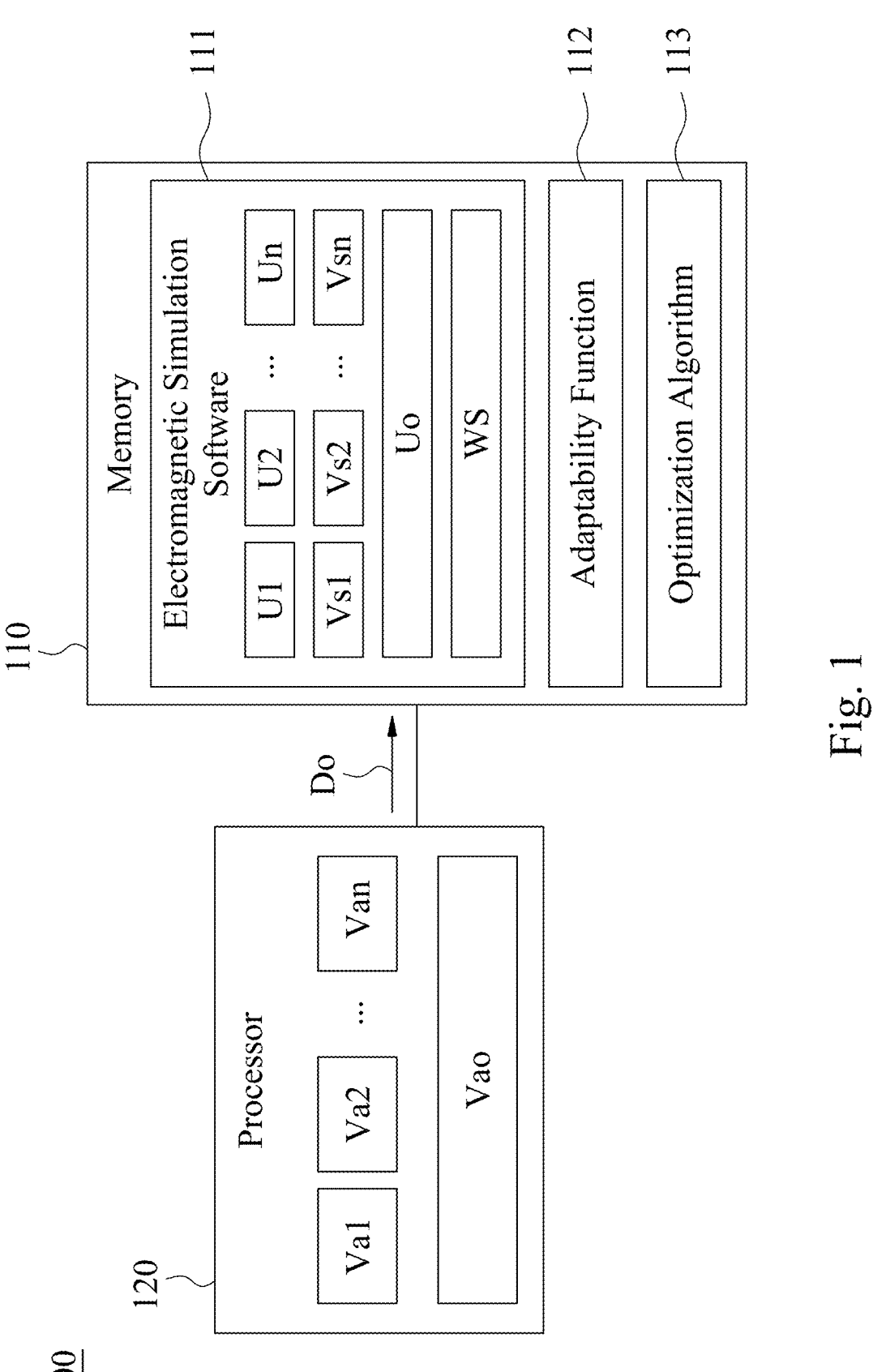
FIG. 1 is a block diagram of a generating system of a wideband reconfigurable intelligent surface according to a first embodiment of the present disclosure.

Please refer to FIG. 1. FIG. 1 is a block diagram of a generating system 100 of a wideband reconfigurable intelligent surface according to a first embodiment of the present disclosure. As shown in FIG. 1, the generating system 100 of the wideband reconfigurable intelligent surface (hereinafter referred to as "the generating system 100") includes a memory 110 and a processor 120.

The memory 110 stores an electromagnetic simulation software 111, an adaptability function 112 and an optimization algorithm 113 and a plurality of software codes encoded by a plurality of instruction sets. The processor 120 is electrically connected to the memory 110, and reads the software codes stored in the memory 110 to execute a generating method of the wideband reconfigurable intelligent surface. When executing the aforementioned generating method of the wideband reconfigurable intelligent surface, the processor 120 can access the memory 110 from time to time to read the electromagnetic simulation software 111, the adaptability function 112 and the optimization algorithm 113, thereby generating a wideband reconfigurable intelligent surface WS.

In some embodiments, the generating system 100 can be an electronic device, which can be but is not limited to, a smartphone, a tablet, a notebook computer, a desktop computer, or other electronic devices. The memory 110 can be a machine-readable medium, which can be but is not limited to, a random access memory (RAM), a read-only memory (ROM), a compact disc read-only memory (CD-ROM), a flash memory, a hard disk drive, a magnetic tape, a floppy disk, or an optical data storage device. The processor 120 can be a computing processor, which can be but is not limited to, a digital signal processor (DSP), a micro processing unit (MPU), a central processing unit (CPU), or other electronic processors.

It should be noted that the wideband reconfigurable intelligent surface WS is actually a data model simulated by the electromagnetic simulation software 111, and the data model includes a plurality of configuration parameters corresponding to the wideband reconfigurable intelligent surface WS. In some embodiments, the generating system 100 can further include a display device (e.g., a screen) that can be configured to display the configuration parameters.

Thus, manufacturers can manufacture a reconfigurable intelligent surface (RIS) that has the same function as the wideband reconfigurable intelligent surface WS based on the configuration parameters displayed by the display device. The generating method of the present disclosure is described in more detail with the drawings and the embodiments below.

Please refer to FIGS. 1 and 2. FIG. 2 is a flow chart of a generating method 200 of a wideband reconfigurable intelligent surface according to a second embodiment of the present disclosure. As shown in FIGS. 1 and 2, the generating method 200 of the wideband reconfigurable intelligent surface (hereinafter referred to as "the generating method 200") can be applied to the generating system 100 and include the following Step S01, Step S02, Step S03, Step S04 and Step S05.

Step S01: executing the electromagnetic simulation software 111 to generate a plurality of reconfigurable reflective units U1, U2, . . . . Un with a plurality of metal patterns by the processor 120.

Step S02: executing the electromagnetic simulation software 111 to simulate the reconfigurable reflective units U1, U2, . . . . Un to obtain a plurality of reflection characteristic simulation values Vs1, Vs2, . . . . Vsn corresponding to the metal patterns by the processor 120.

Step S03: calculating the reflection characteristic simulation values Vs1, Vs2, . . . . Vsn according to the adaptability function 112 to obtain a plurality of adaptability values Va1, Va2, . . . . Van corresponding to the metal patterns by the processor 120.

Step S04: calculating the adaptability values Va1, Va2, . . . . Van according to the optimization algorithm 113 to obtain an optimized adaptability value Vao by the processor 120, wherein the optimal adaptability value Vao corresponds to an optimized metal pattern data Do.

Step S05: importing the optimized metal pattern data Do into the electromagnetic simulation software 111 to generate a plurality of optimized reconfigurable reflective units Uo and forming the wideband reconfigurable intelligent surface WS based on the optimized reconfigurable reflective units Uo by the processor 120, wherein the optimized reconfigurable reflective units Uo are the same as each other.

Therefore, the generating method 200 of the present disclosure can utilize the adaptability function 112 to generate the adaptability values Va1, Va2, . . . . Van correspond-
ing to different metal patterns, utilize the optimization
algorithm 113 to derive from the adaptability values Va1,
Va2, . . . . Van to obtain the optimized adaptability value Vao,
generate the optimized reconfigurable reflective units Uo
with optimized metal patterns according to the optimized
metal pattern data Do corresponding to the optimized adapt-
ability value Vao, and then utilize the optimized reconfig-
urable reflective units Uo to construct the wideband recon-
figurable intelligent surface WS.

Figure 3:
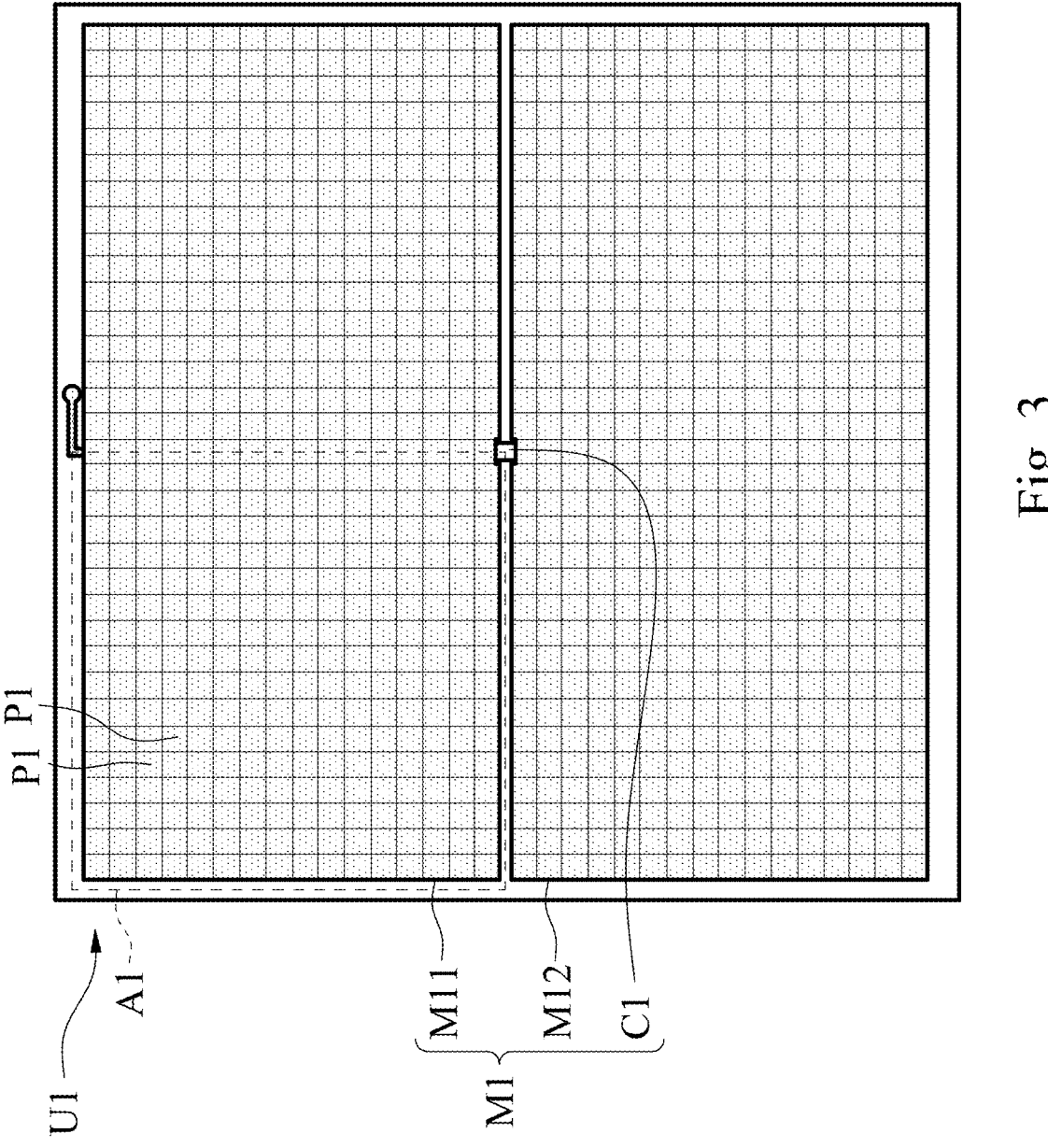
FIG. 3 is a top view of a reconfigurable reflective unit of the present disclosure.
Figure 4:
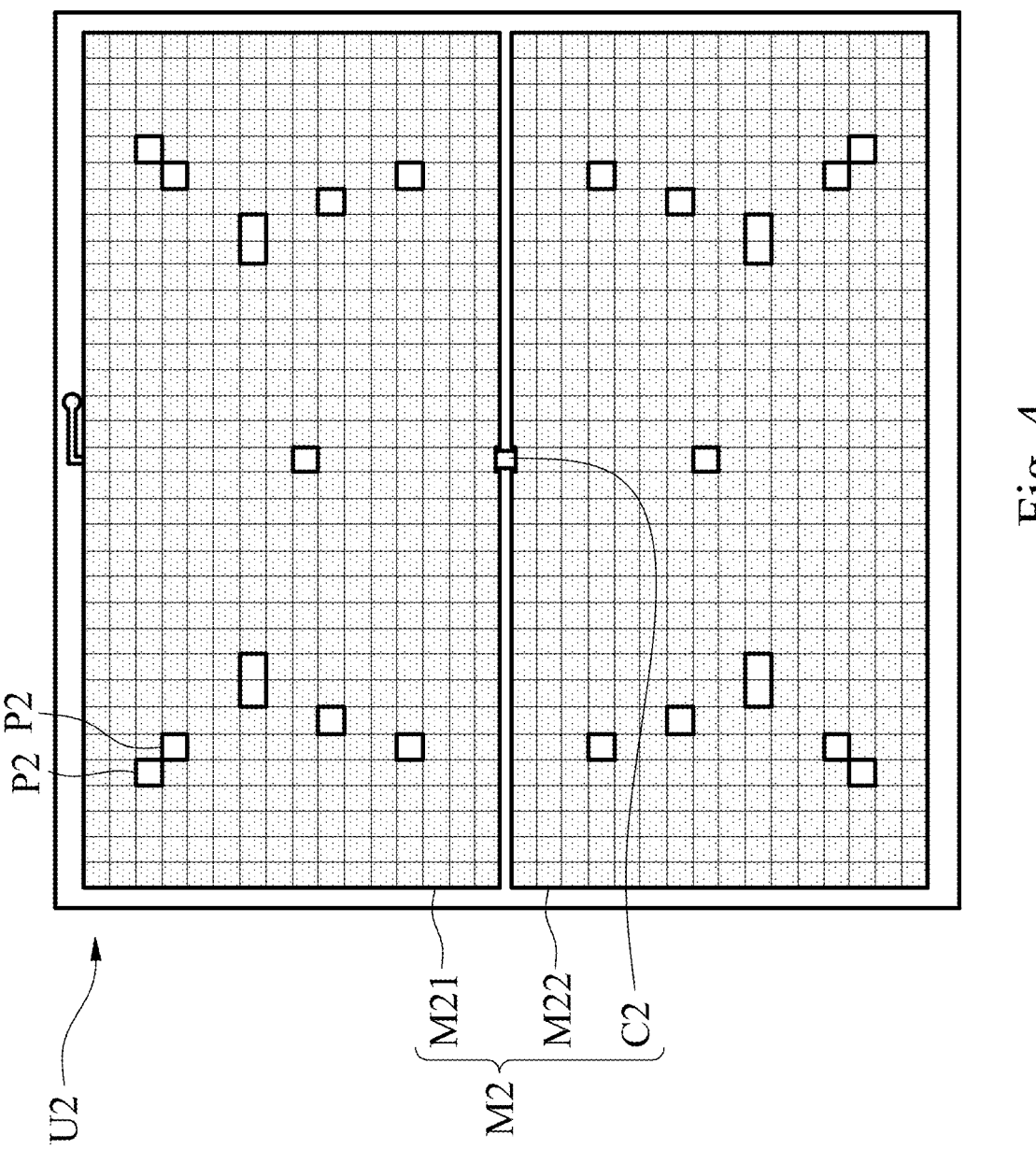
FIG. 4 is a top view of another reconfigurable reflective unit of the present disclosure.
Figure 5:
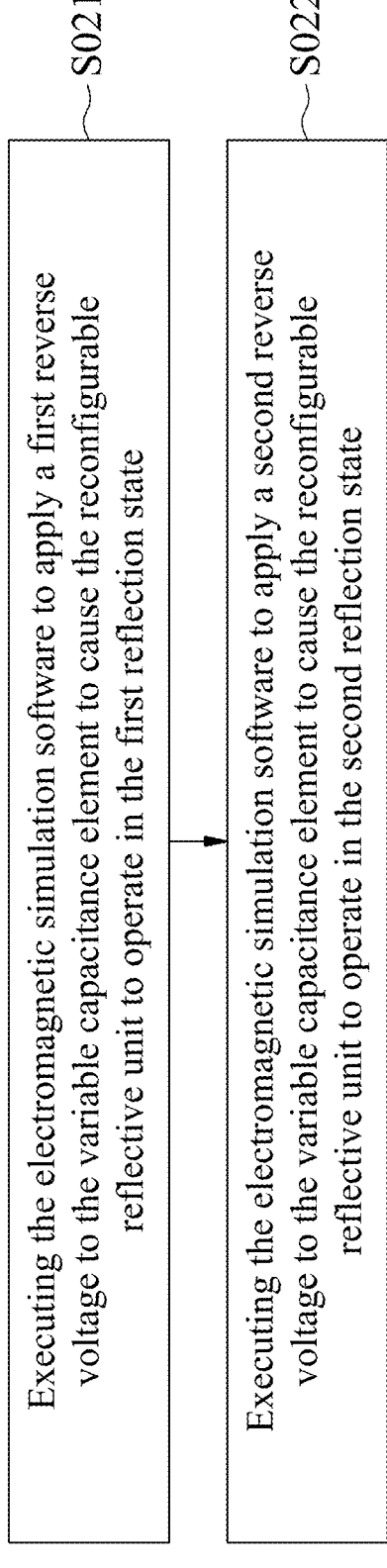
FIG. 5 is a flow chart of a step of obtaining a plurality of reflection characteristic simulation values in FIG. 2.
Figure 7:
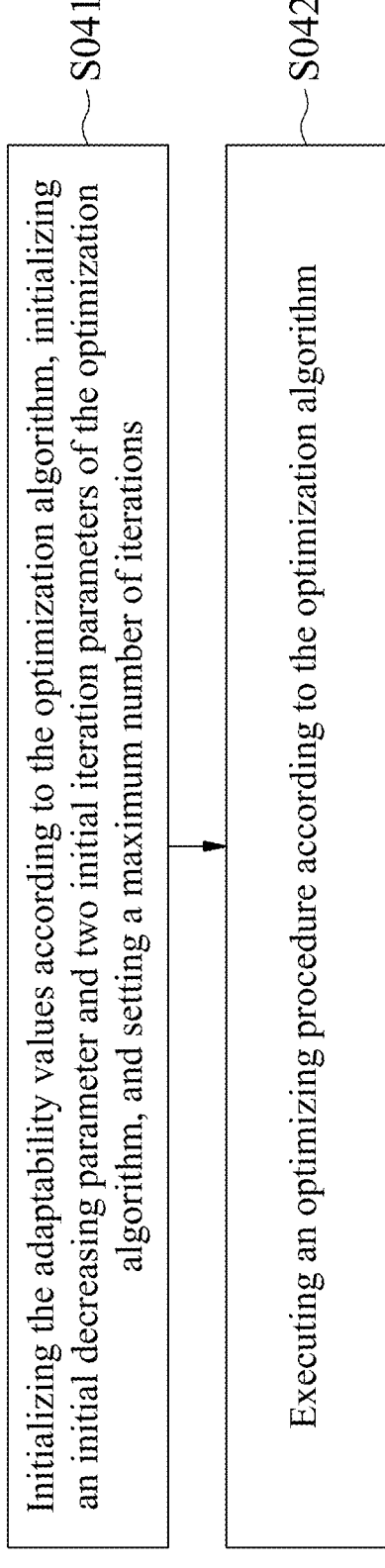
FIG. 7 is a flow chart of a step of obtaining an optimized adaptability value in FIG. 2.
Figure 8:
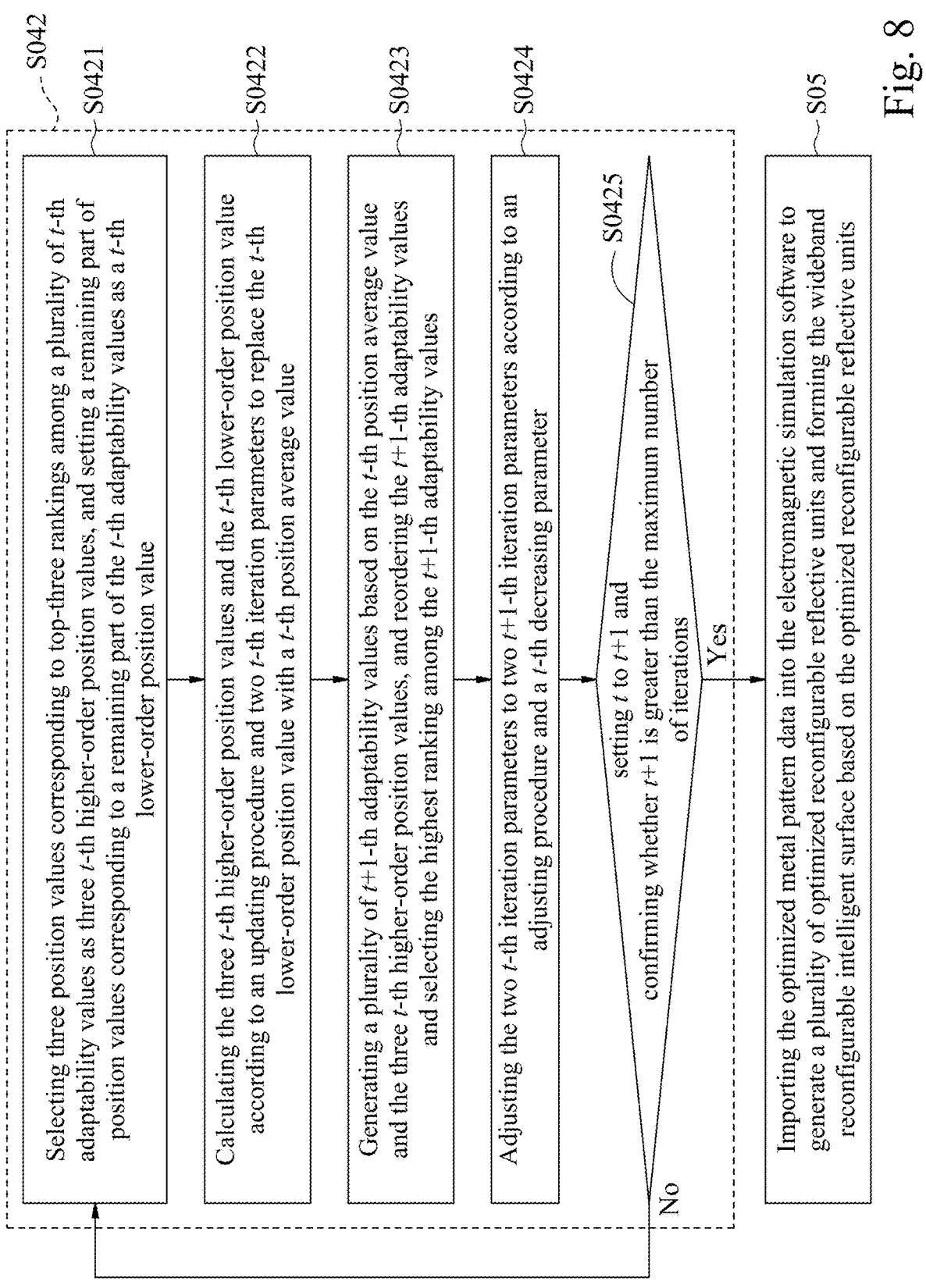
FIG. 8 is a flow chart of a step of executing an optimizing procedure in FIG. 7.
Figure 9:
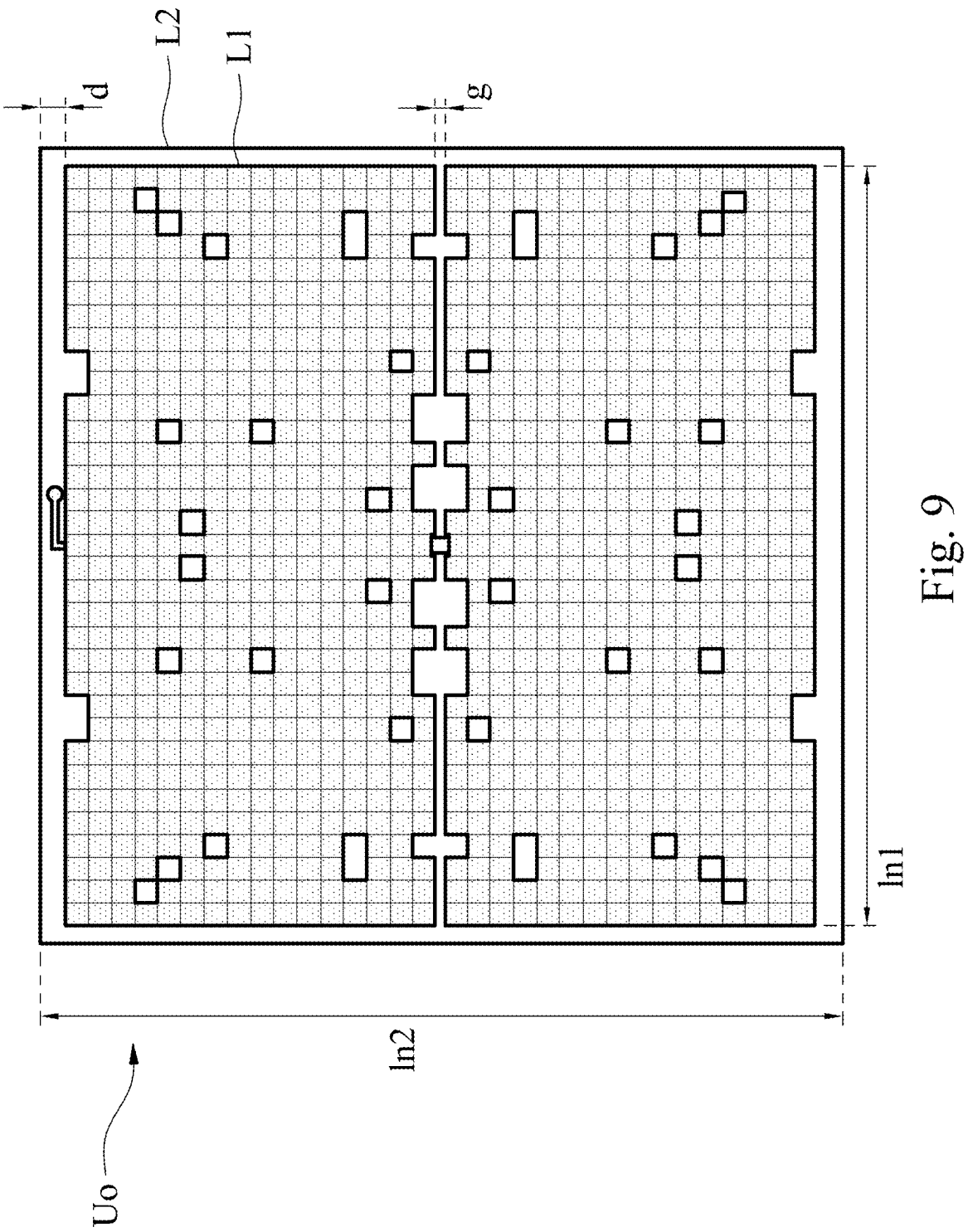
FIG. 9 is a top view of an optimized reconfigurable reflective unit of the present disclosure.
Figure 10:
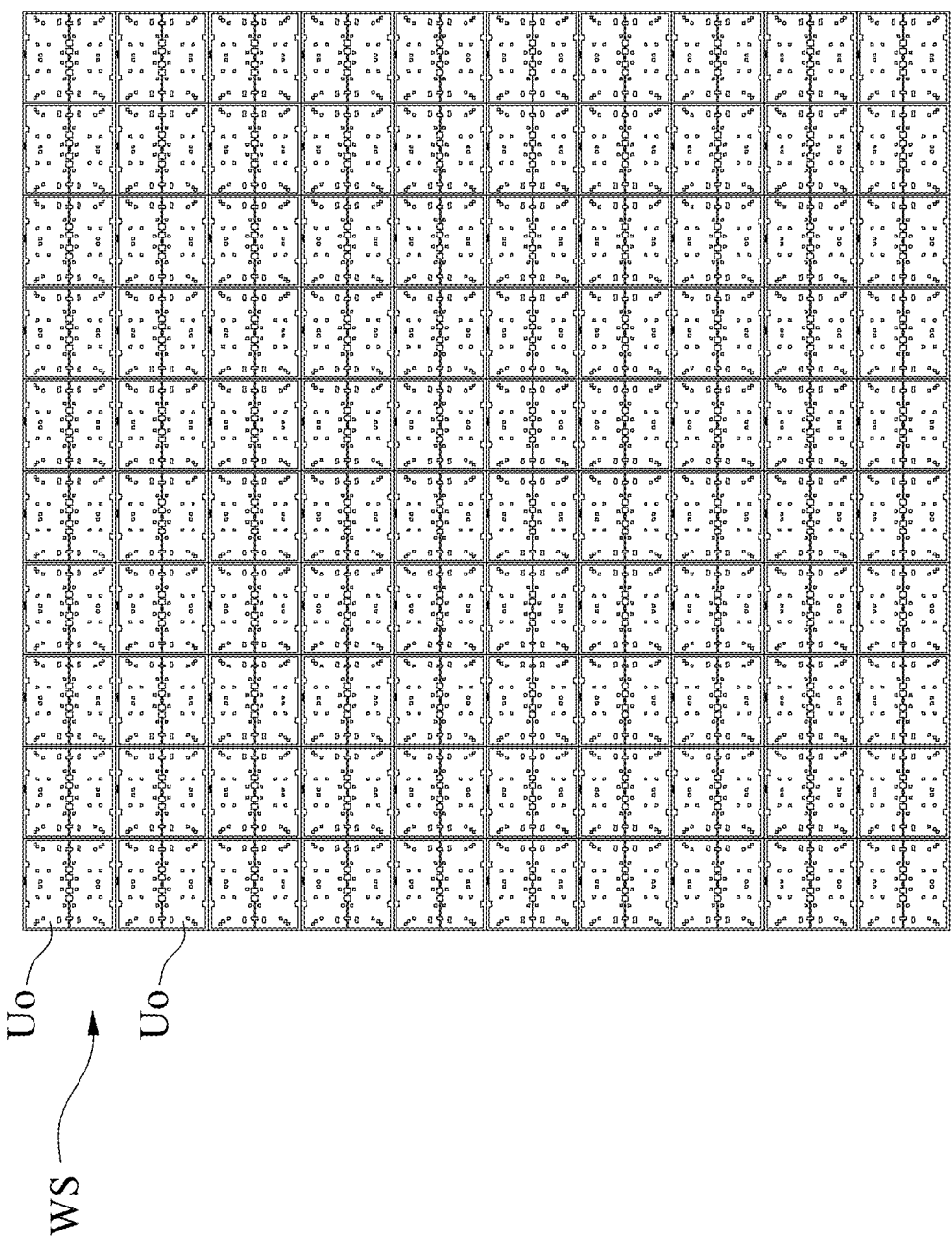
FIG. 10 is a top view of the wideband reconfigurable intelligent surface of the present disclosure.

Please refer to FIGS. 1, 2, 3, 4, 5, 6, 7, 8, 9 and 10. FIG.
3 is a top view of a reconfigurable reflective unit U1 of the
present disclosure. FIG. 4 is a top view of another recon-
figurable reflective unit U2 of the present disclosure. FIG. 5
is a flow chart of Step S02 of obtaining the reflection
characteristic simulation values Vs1, Vs2, . . . . Vsn in FIG.
2. FIG. 6 is a flow chart of Step S03 of obtaining the
adaptability values Va1, Va2, . . . . Van in FIG. 2. FIG. 7 is
a flow chart of Step S04 of obtaining the optimized adapt-
ability value Vao in FIG. 2. FIG. 8 is a flow chart of Step
S042 of executing an optimizing procedure in FIG. 7. FIG.
9 is a top view of the optimized reconfigurable reflective unit
Uo of the present disclosure. FIG. 10 is a top view of the
wideband reconfigurable intelligent surface WS of the pres-
ent disclosure.

In Step S01, each of the reconfigurable reflective units
U1, U2, . . . . Un generated by the electromagnetic simula-
tion software 111 can be an array unit in the reconfigurable
intelligent surface. The electromagnetic simulation software
111 can be three-dimensional full-wave electromagnetic
simulation software, such as Ansys HFSS simulation soft-
ware (provided by ANSYS, Inc.). The number of the recon-
figurable reflective units U1, U2, . . . . Un can be 15, but the
present disclosure is not limited thereto. In addition, the
present disclosure only illustrates the reconfigurable reflec-
tive unit U1 in FIG. 3 and the reconfigurable reflective unit
U2 in FIG. 4 as examples of different metal patterns.

The reconfigurable reflective unit U1 can include a metal
layer M1, and the metal layer M1 includes a first metal
element M11, a second metal element M12 and a variable
capacitance element C1 electrically connected between the
first metal element M11 and the second metal element M12.
The first metal element M11 and the second metal element
M12 are disposed opposite each other, and both can be a
metal patch. The reconfigurable reflective unit U2 can
include a metal layer M2, and the metal layer M2 includes
a first metal element M21, a second metal element M22 and
a variable capacitance element C2 electrically connected
between the first metal element M21 and the second metal
element M22. The first metal element M21 and the second
metal element M22 are disposed opposite each other, and
both can be a metal patch.

The metal layer M1 of the reconfigurable reflective unit
U1 can be regarded as a metal pattern composed of a
plurality of pixel points P1, and all of the pixel points P1
corresponding to the first metal element M11 and the second
metal element M12 have metal materials, which represents
that the first metal element M11 and the second metal
element M12 do not exhibit any voids. The difference in the
reconfigurable reflective unit U2 is that, a part of pixel points
P2 corresponding to the first metal element M21 and the
second metal element M22 do not have metal materials,
which represents that the first metal element M21 and the
second metal element M22 can a plurality of voids. The
number and location of the voids can be randomly set
through the electromagnetic simulation software 111. Thus, the metal patterns of the reconfigurable reflective units U1,
U2, . . . . Un are different from each other.

In Step S02, each of the reflection characteristic simula-
tion values Vs1, Vs2, . . . . Vsn can include a first reflection
loss and a first reflection phase of each of the reconfigurable
reflective units U1, U2, . . . . Un operating in a first reflection
state, and a second reflection loss and a second reflection
phase of each of the reconfigurable reflective units U1,
U2, . . . . Un operating in a second reflection state. The
following takes the reconfigurable reflective unit U1 as an
example for detailed description, and the reconfigurable
reflective units U2, . . . . Un are deduced and so on, and not
described again herein.

As shown in FIG. 5, Step S02 can include Step S021 and
Step S022. Step S021: executing the electromagnetic simu-
lation software 111 to apply a first reverse voltage (e.g., 11
V) to the variable capacitance element C1 to cause the
reconfigurable reflective unit U1 to operate in the first
reflection state by the processor 120. The first reflective state
can represent that the reconfigurable reflective unit U1
operates in ON state. Step S022: executing the electromag-
netic simulation software 111 to apply a second reverse
voltage to the variable capacitance element C1 to cause the
reconfigurable reflective unit U1 to operate in the second
reflection state by the processor 120. The second reflective
state can represent that the reconfigurable reflective unit U1
operates in OFF state. In some embodiments, the variable
capacitance element C1 is an adjustable element in the
reconfigurable reflective unit U1, such as a varactor. The
variable capacitance element C1 can change its capacitance
value according to different reverse bias, and modulate the
reflection phase of the reconfigurable reflective unit U1.
Base on operating under reverse bias, the reconfigurable
reflective unit U1 does not have DC current passing through
it, so the power consumption of the reconfigurable reflective
unit U1 can be significantly reduced.

In Step S03, the adaptability function 112 can include a
loss adaptability function used to evaluate the quality of the
unit reflection loss and a phase adaptability function used to
evaluate the quality of the unit reflection phase. The follow-
ing takes the reconfigurable reflective unit U1 as an example
for detailed description, and the reconfigurable reflective
units U2, . . . . Un are deduced and so on, and not described
again herein.

As shown in FIG. 6, Step S03 can include Step S031, Step
S032 and Step S033. Step S031: calculating the first reflec-
tion loss and the second reflection loss corresponding to the
metal pattern of the reconfigurable reflective unit U1 accord-
ing to the loss adaptability function of the adaptability
function 112 to obtain a loss adaptability value by the
processor 120. In Step S031, the loss adaptability function
conforms to the following equation (1):

$$f_1 = \sum_{n=1}^{N} \left[ (RL_{on,n} - 3)^2 + (RL_{off,n} - 3)^2 \right]. \tag{1}$$

In the equation (1), N is a number of frequency points that
the reconfigurable reflective unit U1 operates within a target
bandwidth range, n is a positive integer, $RL_{on}$ is the first
reflection loss (its unit is dB), $RL_{off}$ is the second reflection
loss (its unit is dB), and $f_1$ is the loss adaptability value.

Step S032: calculating the first reflection phase and the
second reflection phase corresponding to the metal pattern of
the reconfigurable reflective unit U1 according to the phase
adaptability function of the adaptability function 112 to obtain a phase adaptability value by the processor 120. In Step S032, the phase adaptability function conforms to the following equation (2):

$$f_2 = \sum_{n=1}^{N} (\text{mod}((|\text{Phase}_{on,n} - \text{Phase}_{off,n}|, 360°)) - 180°). \qquad (2)$$

In the equation (2), mod is a modulo operation, N is a number of frequency points that the reconfigurable reflective unit U1 operates within the target bandwidth range, n is a positive integer, $\text{Phase}_{on}$ is the first reflection phase, $\text{Phase}_{off}$ is the second reflection phase, and $f_2$ is the phase adaptability value.

In detail, since the metal layer M1 of the reconfigurable reflective unit U1 can be the metal pattern composed of the pixel points P1, the processor 120 can frame a scanning area A1 from the metal layer M1 before executing Step S03. The entire metal layer M1 is regarded as a pixel matrix composed of 16×16 pixel points P1 in the scanning area A1 that are mirrored and copied to other areas. In the pixel matrix, if the pixel point P1 does not have the metal material, it is expressed as 0; if the pixel point P1 has the metal material, it is expressed as a 1. In order to get the advantages of broadband in the wideband reconfigurable intelligent surface WS, the target bandwidth can be set to 400 MHz, and the target bandwidth range can be set to 4.5 GHz~4.9 GHz, and the number of the frequency points can be 101, 201, 401 or 801, but the present disclosure is not limited thereto. Moreover, in order to get the advantages of low reflection loss in the wideband reconfigurable intelligent surface WS, and the wideband reconfigurable intelligent surface WS can maintain the reflection phase difference (i.e., phase bandwidth) between 180°±20° under different reflection states, the target reflection loss can be set to 3 dB (that is, the reflection loss must be lower than 3 dB) in the equation (1), and the processor 120 uses 360° to perform the modulo operation on the phase difference of the reconfigurable reflective unit U1 in the first reflection state and the second reflection state in the equation (2), and then subtracted by 180°, so that the phase shift corresponding to the metal pattern of the reconfigurable reflective unit U1 can be observed.

Step S033: utilizing a first weight and a second weight to perform a weighted calculation on the loss adaptability value ($f_1$) and the phase adaptability value ($f_2$) respectively to obtain the adaptability value corresponding to the metal pattern of the reconfigurable reflective unit U1 by the processor 120. In Step S033, the weighted calculation conforms to the following equation (3):

$$f = w_1 f_1 + w_2 f_2. \qquad (3)$$

In the equation (3), f is the adaptability value, $w_1$ is the first weight, $f_1$ is the loss adaptability value, $w_2$ is the second weight, $f_2$ is the phase adaptability value, and $w_1+w_2=1$. In the embodiment, the first weight ($w_1$) can be 0.5, and the second weight ($w_2$) can be 0.5, but the present disclosure is not limited thereto.

As shown in FIG. 7, Step S04 can include Step S041 and Step S042. Step S041: initializing the adaptability values Va1, Va2, . . . . Van according to the optimization algorithm 113, initializing an initial decreasing parameter and two initial iteration parameters of the optimization algorithm 113, and setting a maximum number of iterations by the processor 120. The optimization algorithm 113 can be a grey wolf optimization (GWO) algorithm. Compared with other group optimization algorithms, the GWO algorithm has better global search capabilities, and is equipped with the adaptability function 112 used to evaluate the qualities of reflection loss and reflection phase, thereby avoiding finding local optimal solutions. In Step S041, the processor 120 sorts the adaptability values Va1, Va2, . . . . Van according to the adaptability of the adaptability values Va1, Va2, . . . . Van, and assigns the corresponding wolf level. For example, if the adaptability value Va2 is better than the adaptability value Va1, that is, compared with the reconfigurable reflective unit U1 corresponding to the adaptability value Va1, the reconfigurable reflective unit U2 corresponding to the adaptability value Va2 is more consistent with the reflection loss lower than 3 dB, and the reflection phase difference is between 180°±20°, so the adaptability value Va2 can be assigned to a higher wolf level, and so on. In the optimization algorithm 113, the number of grey wolf individuals is 15, the maximum number of iterations (Max_t) is set to 12, the initial decreasing parameter is set to a and a=2, the two initial iteration parameters are set to A and C respectively, and both of A and C are coefficients, where "initial" represents that the current iteration number is 0 (t=0). Step S042: executing an optimizing procedure according to the optimization algorithm 113 by the processor 120.

As shown in FIG. 8, Step S042 can include Step S0421, Step S0422, Step S0423, Step S0424 and Step S0425. Step S0421: selecting three position values corresponding to top-three rankings among a plurality of t-th adaptability values as three t-th higher-order position values, and setting a remaining part of position values corresponding to a remaining part of the t-th adaptability values as a t-th lower-order position value by the processor 120. In Step S0421, the processor 120 records the three position values (i.e., the three t-th higher-order position values) of the top-three rankings among the t-th adaptability values as $X_\alpha(t)$, $X_\beta(t)$ and $X_\delta(t)$ respectively, and records the position value with the best adaptability value as the current best solution (i.e., the leader wolf who is closest to the optimal metal pattern at the moment), wherein the position value can include a metal pattern data, and the metal pattern data can represent whether each of the pixel points in the metal pattern has a metal material. At the same time, the processor 120 records the remaining part of position values corresponding to the remaining part of the t-th adaptability values as X(t), that is, the t-th lower-order position value.

Step S0422: calculating the three t-th higher-order position values and the t-th lower-order position value according to an updating procedure and two t-th iteration parameters to replace the t-th lower-order position value with a t-th position average value by the processor 120. In Step S0422, the updating procedure conforms to the following equations (4), (5) and (6):

$$\begin{cases} D_\alpha(t) = |C \cdot X_\alpha(t) - X(t)| \\ D_\beta(t) = |C \cdot X_\beta(t) - X(t)| \; ; \\ D_\delta(t) = |C \cdot X_\delta(t) - X(t)| \end{cases} \qquad (4)$$

$$\begin{cases} X_1(t) = X_\alpha(t) - A \cdot D_\alpha(t) \\ X_2(t) = X_\beta(t) - A \cdot D_\beta(t) \; ; \\ X_3(t) = X_\delta(t) - A \cdot D_\delta(t) \end{cases} \qquad (5)$$

$$X_P(t) = \frac{[X_1(t) + X_2(t) + X_3(t)]}{3}. \qquad (6)$$

In the equations (4) to (6), A and C are respectively the two t-th iteration parameters and both of A and C are coefficients, $X_\alpha(t)$, $X_\beta(t)$ and $X_\delta(t)$ is the three t-th higher-order position values, $D_\alpha(t)$, $D_\beta(t)$ and $D_\delta(t)$ are respectively three position distance values between the t-th lower-order position value and the three t-th higher-order position values, $X_1(t)$, $X_2(t)$ and $X_3(t)$ are respectively three updated position values after the t-th lower-order position value is updated based on the three t-th higher-order position values, and $X_P(t)$ is the t-th position average value. The processor 120 utilizes the equation (4) to calculate the distances between the position value (i.e., the t-th lower-order position value $X(t)$) of the remaining grey wolf individual not in the top-three rankings and the position values (i.e., the three t-th higher-order position values $X_\alpha(t)$, $X_\beta(t)$ and $X_\delta(t)$) of the top-three grey wolf individuals. The processor 120 updates the old position value of the remaining grey wolf individual not in the top-three rankings to a new position value (i.e., the t-th position average value $X_P(t)$) by using the t-th position average value calculated from equations (5) and (6).

Step S0423: generating a plurality of t+1-th adaptability values based on the t-th position average value and the three t-th higher-order position values, and reordering the t+1-th adaptability values and selecting the highest ranking among the t+1-th adaptability values by the processor 120. In Step S0423, the processor 120 imports the metal pattern data in the t-th position average value and the three t-th higher-order position values to the electromagnetic simulation software 111 to generate a plurality of reconfigurable reflective units corresponding to the metal pattern data in the t-th position average value and the three t-th higher-order position values. The processor 120 calculates a plurality of reflection characteristic simulation values corresponding to the aforementioned reconfigurable reflective units according to the adaptability function 112 to obtain the t+1-th adaptability values; therefore, the processor 120 reorders the t+1-th adaptability values and assigns the corresponding wolf levels, and selects the highest ranking among the t+1-th adaptability values.

Step S0424: adjusting the two t-th iteration parameters to two t+1-th iteration parameters according to an adjusting procedure and a t-th decreasing parameter by the processor 120. In Step S0424, the adjusting procedure conforms to the following equations (7) and (8):

$$A = 2a \cdot r_1 - a; \tag{7}$$

$$C = 2 \cdot r_2. \tag{8}$$

In the equations (7) and (8), a is the t-th decreasing parameter and decreases from 2 to 0 as the number of iterations increases, both of $r_1$ and $r_2$ are random numbers between [0,1], A and C are respectively the two t+1-th iteration param(1)eters. It can be seen from the equations (7) and (8) that the processor 120 utilizes the t-th decreasing parameter (a) and the random numbers in the current iteration process to adjust the two t+1-th iteration parameters used in the next iteration process.

Step S0425: setting t to t+1 and confirming whether t+1 is greater than the maximum number of iterations by the processor 120, where t is a number of iterations. In response to determine that t+1 is less than or equal to the maximum number of iterations (i.e., "No"), the processor 120 re-executes the optimizing procedure; in response to determine that t+1 is greater than the maximum number of iterations (i.e., "Yes"), the processor 120 determines that the highest ranking among the t+1-th adaptability values is the optimized adaptability value Vao, and a position value corresponding to the optimized adaptability value Vao includes the optimized metal pattern data Do. In Step S0425, if t+1 is greater than the maximum number of iterations (i.e., 12), the next iteration process will be stopped, then the processor 120 records the optimized adaptability value Vao and outputs the optimized metal pattern data Do corresponding to the optimized adaptability value Vao to continue Step S05; if t+1 is less than or equal to the maximum number of iterations, the processor 120 re-executes Step S0421, Step S0422, Step S0423, Step S0424 and Step S0425 in sequence.

As shown in FIGS. 9 and 10, in Step S05, the processor 120 executes the electromagnetic simulation software 111 to generate the optimized reconfigurable reflective unit Uo with the optimized metal pattern based on the optimized metal pattern data Do, and arranges a plurality of the optimized reconfigurable reflective units Uo in an array to construct the wideband reconfigurable intelligent surface WS. Therefore, the generating method 200 of the present disclosure utilizes the optimization algorithm 113 to obtain the best solution that can meet the target bandwidth range (4.5 GHz~4.9 GHz) and the target reflection loss (3 dB) in the adaptability function 112, so that the wideband reconfigurable intelligent surface WS has the characteristics of broadband and low reflection loss compared with the reconfigurable intelligent surface in the prior art.

Figure 11:
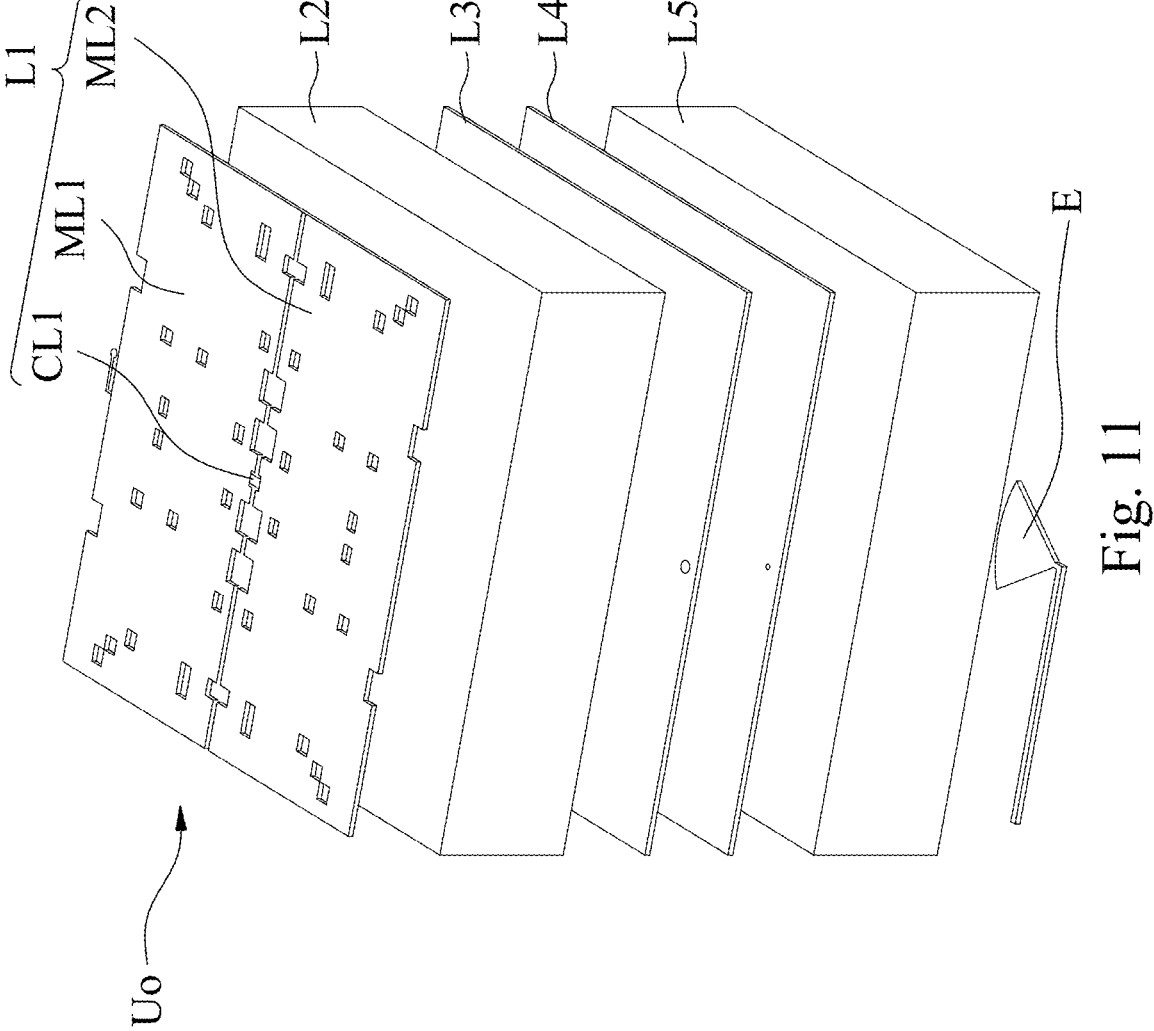
FIG. 11 is an exploded view of the optimized reconfigurable reflective unit in FIG. 9.
Figure 12:
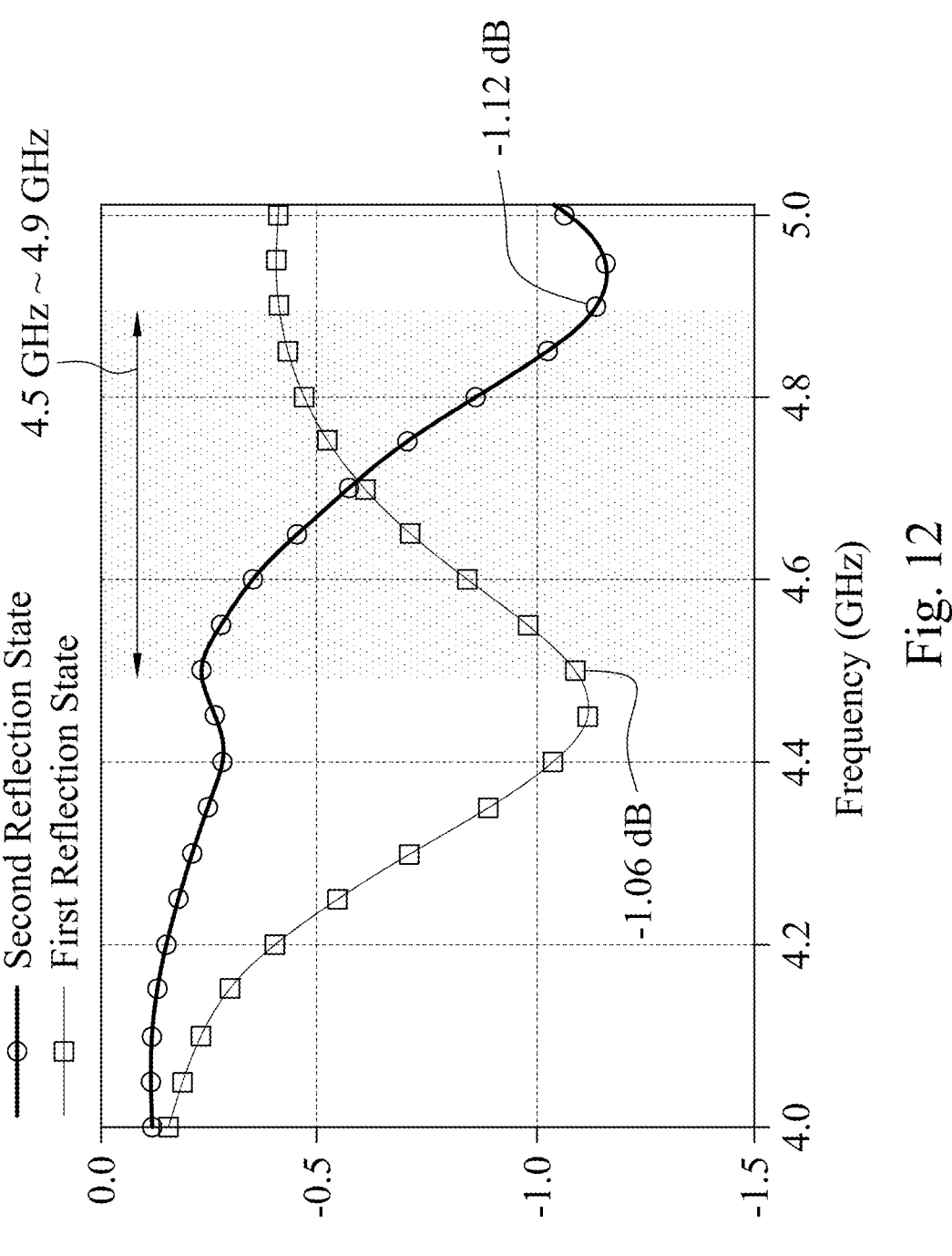
FIG. 12 is a simulation diagram of reflection coefficients of the optimized reconfigurable reflective unit in FIG. 9 operating in a first reflection state and a second reflection state.
Figure 13:
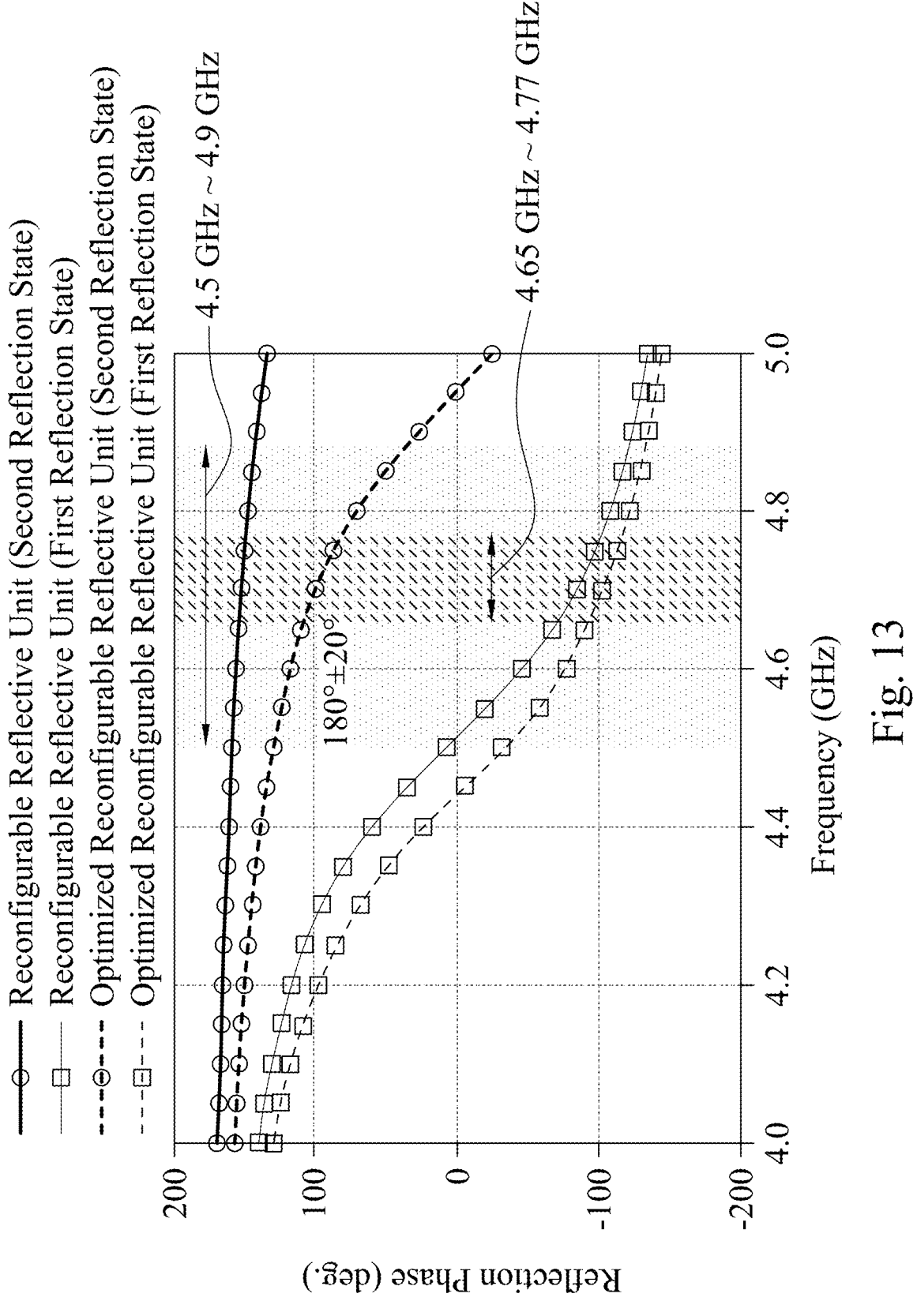
FIG. 13 is a simulation diagram of reflection phases of the reconfigurable reflective unit in FIG. 3 and the optimized reconfigurable reflective unit in FIG. 9 operating in the first reflection state and the second reflection state.

Please refer to FIGS. 3, 9, 11, 12 and 13. FIG. 11 is an exploded view of the optimized reconfigurable reflective unit Uo in FIG. 9. FIG. 12 is a simulation diagram of reflection coefficients (S11 parameter) of the optimized reconfigurable reflective unit Uo in FIG. 9 operating in the first reflection state and the second reflection state. FIG. 13 is a simulation diagram of reflection phases of the reconfigurable reflective unit U1 in FIG. 3 and the optimized reconfigurable reflective unit Uo in FIG. 9 operating in the first reflection state and the second reflection state.

As shown in FIGS. 9 and 11, the optimized reconfigurable reflective unit Uo can be a stacked structure, which includes a metal layer L1, a dielectric layer L2, a ground layer L3, an adhesive layer L4 and a base layer L5 that are stacked in sequence. The structure of the metal layer L1 is constructed via the generating method 200 and has the optimized metal pattern. The upper surface of the dielectric layer L2 is connected to the lower surface of the metal layer L1. The upper surface of the ground layer L3 is connected to the lower surface of the dielectric layer L2. The upper surface of the adhesive layer L4 is connected to the lower surface of the ground layer L3. The upper surface of the base layer L5 is connected to the lower surface of the adhesive layer L4.

The metal layer L1 can include a first metal element ML1, a second metal element ML2 and a variable capacitance element CL1. The variable capacitance element CL1 is electrically connected between the first metal element ML1 and the second metal element ML2. The metal layer L1 can be configured to receive an electromagnetic wave emitted from an electromagnetic wave source (such as a horn antenna), and modulate the reflection state of the optimized reconfigurable reflective unit Uo according to the reverse bias applied to the variable capacitance element CL1. The dielectric layer L2 can be but is not limited to, Rogers Corporation. RO4003C high-frequency board or other dielectric material substrate, and its dielectric constant can be determined according to actual requirements. The ground layer L3 can be a metal substrate and is configured to provide grounding. The adhesive layer L4 can be composed of sheet adhesive. The base material layer L5 can be but is not limited to, a glass fiber unclad laminate (e.g., Flame Retardant 4 (FR4)). In addition, the optimized reconfigurable reflective unit Uo can further include a radio frequency inhibiting element E, which can be a radio frequency choke and is disposed on the lower surface of the base layer L5. The radio frequency inhibiting element E has a fan shape and is configured to inhibit and block the high frequency signal or AC voltage generated by the metal layer L1.

Viewed from top, the optimized reconfigurable reflective unit Uo has a square shape. The metal layer L1 has a side length In1, and all of the dielectric layer L2, the ground layer L3, the adhesive layer L4 and the base layer L5 have a side length In2. A separation distance d is disposed between the outer frame of the metal layer L1 and the outer frame of the dielectric layer L2, and a gap g is disposed between the first metal element ML1 and the second metal element ML2. Please refer to Table 1, which lists the configuration parameters of the optimized reconfigurable reflective unit Uo.

TABLE 1

| Side length In1 | 29 mm |
| Side length In2 | 30.9 mm |
| Separation distance d | 0.5 mm |
| Gap g | 0.37 mm |

As shown in FIG. 12, when the reflection phase difference is between 180°±20°, the reflection losses of the optimized reconfigurable reflective unit Uo in the first reflection state and the second reflection state do not exceed 1.2 dB. As shown in FIG. 13, compared with the reconfigurable reflective unit U1 having been unoptimized, the reflection phase difference of the optimized reconfigurable reflective unit Uo within the target bandwidth range (4.5 GHz~4.9 GHz) can be maintained at 180°±20°.

Figure 14:
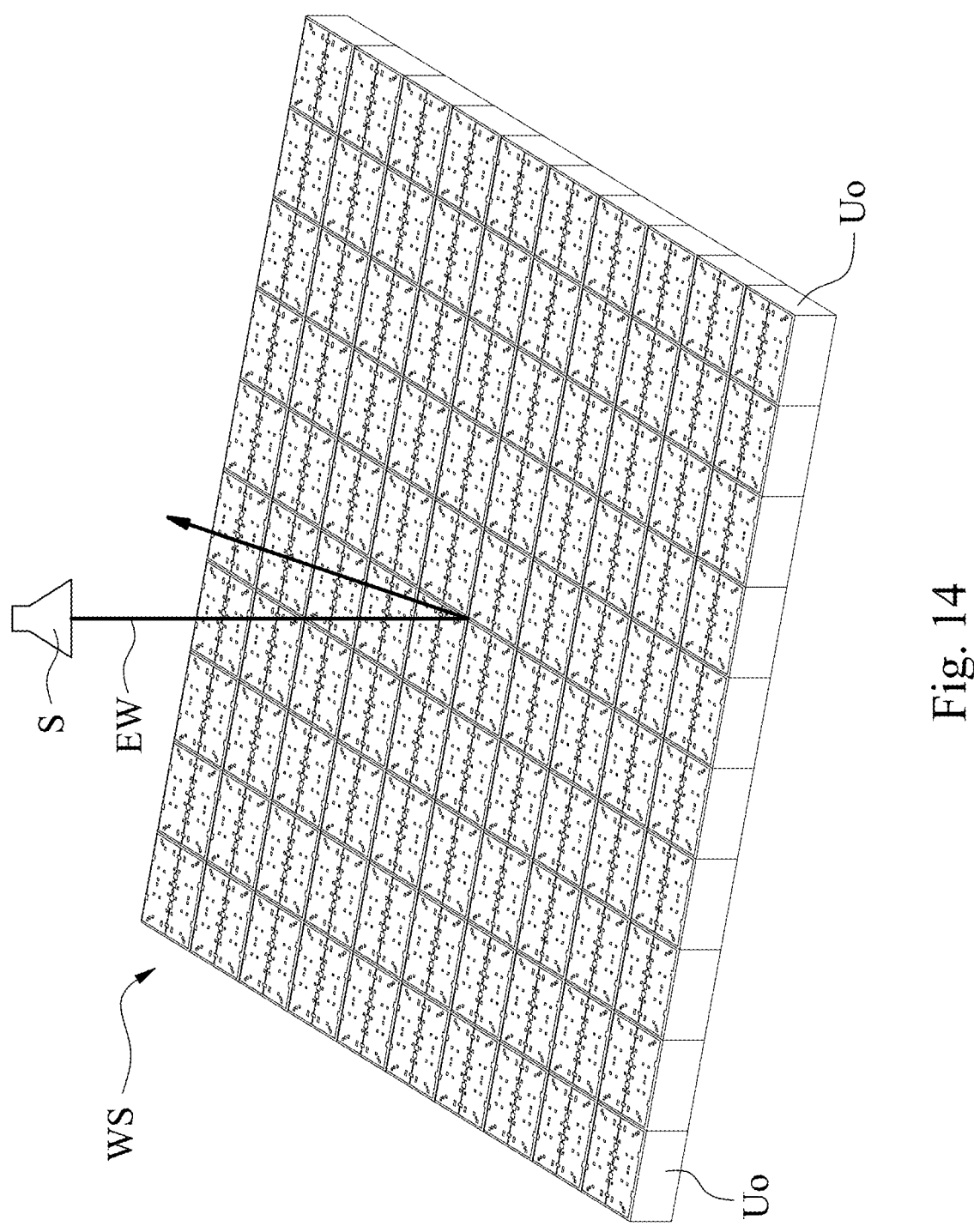
FIG. 14 is a three-dimensional schematic view of the wideband reconfigurable intelligent surface in FIG. 10.
Figure 15:
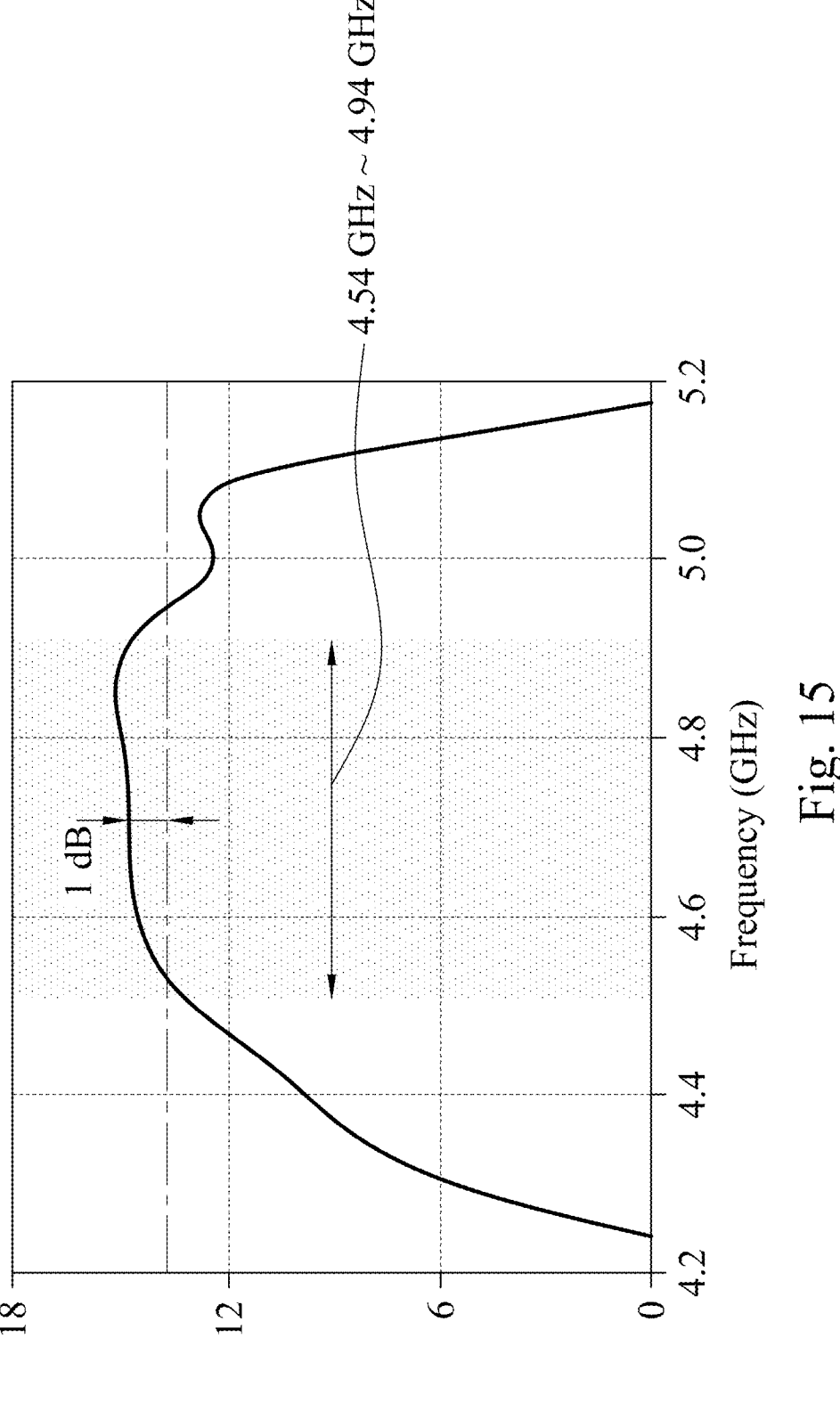
FIG. 15 is a simulation diagram of 1 dB gain bandwidth of the wideband reconfigurable intelligent surface in FIG. 10.

Please refer to FIGS. 14 and 15. FIG. 14 is a three-dimensional schematic view of the wideband reconfigurable intelligent surface WS in FIG. 10. FIG. 15 is a simulation diagram of 1 dB gain bandwidth of the wideband reconfigurable intelligent surface WS in FIG. 10.

As shown in FIG. 14, the wideband reconfigurable intelligent surface WS can be an array structure, and its size can be 309×309 mm². The wideband reconfigurable intelligent surface WS is composed of a plurality of the optimized reconfigurable reflective unit Uo, and the number of the optimized reconfigurable reflective units Uo can be 100, but the present disclosure is not limited thereto. The wideband reconfigurable intelligent surface WS can change its electrical characteristics by controlling the adjustable elements (i.e., the variable capacitance elements CL1) in the optimized reconfigurable reflective units Uo, so that the reflection amplitude and the reflection phase of the optimal reconfigurable reflective units Uo are changed. When an electromagnetic wave source S (such as a horn antenna) emits an electromagnetic wave EW to the wideband reconfigurable intelligent surface WS, the optimized reconfigurable reflection unit Uo is excited and drives the electromagnetic wave EW to produce different propagation behaviors, such as reflection, absorption, focusing and polarization.

Taking the incident angle of the electromagnetic wave EW at 0° and the reflection angle at 30° as an example, the simulation results of the influence of frequency of the wideband reconfigurable intelligent surface WS on gain are shown in FIG. 15. Within the bandwidth range (4.54 GHz~4.94 GHz), the gain of the wideband reconfigurable intelligent surface WS can be maintained within 1 dB, and is consistent with the bandwidth range (4.5 GHz~4.9 GHz) of the optimized reconfigurable reflective unit Uo, both are 400 MHz.

According to the aforementioned embodiments and examples, the advantages of the present disclosure are described as follows.

1. The reflection loss and the reflection phase of the reconfigurable reflective unit are evaluated through the adaptability function, so that the optimized reconfigurable reflective unit has low loss characteristics, and the reflection phase difference can be between 180°±20° under different reflection states.

2. In order to improve the shortcomings of narrow band and high reflection loss of the reconfigurable reflective unit in the prior art, the optimization algorithm is used to configure the optimized reconfigurable reflective unit with broadband and low reflection loss characteristics, and the optimized reconfigurable reflective units are arranged in an array to generate the wideband reconfigurable intelligent surface. Thus, the wideband reconfigurable intelligent surface also has the characteristics of broadband and low reflection loss.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A generating method of a wideband reconfigurable intelligent surface, comprising:

executing an electromagnetic simulation software to generate a plurality of reconfigurable reflective units with a plurality of metal patterns by a processor;

executing the electromagnetic simulation software to simulate the reconfigurable reflective units to obtain a plurality of reflection characteristic simulation values corresponding to the metal patterns by the processor;

calculating the reflection characteristic simulation values according to an adaptability function to obtain a plurality of adaptability values corresponding to the metal patterns by the processor;

calculating the adaptability values according to an optimization algorithm to obtain an optimized adaptability value by the processor, wherein the optimal adaptability value corresponds to an optimized metal pattern data; and importing the optimized metal pattern data into the electromagnetic simulation software to generate a plurality of optimized reconfigurable reflective units and forming the wideband reconfigurable intelligent surface based on the optimized reconfigurable reflective units by the processor, wherein the optimized reconfigurable reflective units are the same as each other.

2. The generating method of the wideband reconfigurable intelligent surface of claim 1, wherein each of the reflection characteristic simulation values comprises a first reflection loss and a first reflection phase of each of the reconfigurable reflective units operating in a first reflection state and a second reflection loss and a second reflection phase of each of the reconfigurable reflective units operating in a second reflection state, and a step of calculating the reflection characteristic simulation values according to the adaptability function to obtain the adaptability values corresponding to the metal patterns by the processor comprises:

calculating the first reflection loss and the second reflection loss corresponding to each of the metal patterns according to a loss adaptability function of the adaptability function to obtain a loss adaptability value by the processor;

calculating the first reflection phase and the second reflection phase corresponding to each of the metal patterns according to a phase adaptability function of the adaptability function to obtain a phase adaptability value by the processor; and utilizing a first weight and a second weight to perform a weighted calculation on the loss adaptability value and the phase adaptability value respectively to obtain each of the adaptability values corresponding to each of the metal patterns by the processor.

3. The generating method of the wideband reconfigurable intelligent surface of claim 2, wherein each of the reconfigurable reflective units comprises a metal layer, the metal layer comprises a first metal element, a second metal element and a variable capacitance element electrically connected between the first metal element and the second metal element, and a step of executing the electromagnetic simulation software to simulate the reconfigurable reflective units to obtain the reflection characteristic simulation values corresponding to the metal patterns by the processor comprises:

executing the electromagnetic simulation software to apply a first reverse voltage to the variable capacitance element to cause each of the reconfigurable reflective units to operate in the first reflection state by the processor; and executing the electromagnetic simulation software to apply a second reverse voltage to the variable capacitance element to cause each of the reconfigurable reflective units to operate in the second reflection state by the processor.

4. The generating method of the wideband reconfigurable intelligent surface of claim 2, wherein the loss adaptability function conforms to the following equation:

$$f_1 = \sum_{n=1}^{N}\left[(RL_{on,n} - 3)^2 + (RL_{off,n} - 3)^2\right];$$

wherein N is a number of frequency points that each of the reconfigurable reflective units operates within a target bandwidth range, n is a positive integer, $RL_{on}$ is the first reflection loss, $RL_{off}$ is the second reflection loss, and $f_1$ is the loss adaptability value.

5. The generating method of the wideband reconfigurable intelligent surface of claim 2, wherein the phase adaptability function conforms to the following equation:

$$f_2 = \sum_{n=1}^{N}(\text{mod}((|\text{Phase}_{on,n} - \text{Phase}_{off,n}|, 360°)) - 180°);$$

wherein mod is a modulo operation, N is a number of frequency points that each of the reconfigurable reflective units operates within a target bandwidth range, n is a positive integer, $\text{Phase}_{on}$ is the first reflection phase, $\text{Phase}_{off}$ is the second reflection phase, and $f_2$ is the phase adaptability value.

6. The generating method of the wideband reconfigurable intelligent surface of claim 1, wherein the processor initializes the adaptability values according to the optimization algorithm, the processor initializes an initial decreasing parameter and two initial iteration parameters of the optimization algorithm and sets a maximum number of iterations, the processor executes an optimizing procedure according to the optimization algorithm, and the optimizing procedure is executed to implement the following steps:

selecting three position values corresponding to top-three rankings among a plurality of t-th adaptability values as three t-th higher-order position values, and setting a remaining part of position values corresponding to a remaining part of the t-th adaptability values as a t-th lower-order position value by the processor;

calculating the three t-th higher-order position values and the t-th lower-order position value according to an updating procedure and two t-th iteration parameters to replace the t-th lower-order position value with a t-th position average value by the processor;

generating a plurality of t+1-th adaptability values based on the t-th position average value and the three t-th higher-order position values, and reordering the t+1-th adaptability values and selecting the highest ranking among the t+1-th adaptability values by the processor;

adjusting the two t-th iteration parameters to two t+1-th iteration parameters according to an adjusting procedure and a t-th decreasing parameter by the processor; and setting t to t+1 and confirming whether t+1 is greater than the maximum number of iterations by the processor, where t is a number of iterations;

wherein in response to determine that t+1 is less than or equal to the maximum number of iterations, the processor re-executes the optimizing procedure;

wherein in response to determine that t+1 is greater than the maximum number of iterations, the processor determines that the highest ranking among the t+1-th adaptability values is the optimized adaptability value, and a position value corresponding to the optimized adaptability value comprises the optimized metal pattern data.

7. The generating method of the wideband reconfigurable intelligent surface of claim 6, wherein the updating procedure conforms to the following equation:

$$\begin{cases} D_\alpha(t) = |C \cdot X_\alpha(t) - X(t)| \\ D_\beta(t) = |C \cdot X_\beta(t) - X(t)| \\ D_\delta(t) = |C \cdot X_\delta(t) - X(t)| \end{cases};$$

$$\begin{cases} X_1(t) = X_\alpha(t) - A \cdot D_\alpha(t) \\ X_2(t) = X_\beta(t) - A \cdot D_\beta(t) \\ X_3(t) = X_\delta(t) - A \cdot D_\delta(t) \end{cases};$$

$$X_P(t) = \frac{[X_1(t) + X_2(t) + X_3(t)]}{3};$$

wherein A and C are respectively the two t-th iteration parameters and both of A and C are coefficients, $X_\alpha(t)$, $X_\beta(t)$ and $X_\delta(t)$ is the three t-th higher-order position values, $D_\alpha(t)$, $D_\beta(t)$ and $D_\delta(t)$ are respectively three position distance values between the t-th lower-order position value and the three t-th higher-order position values, $X_1(t)$, $X_2(t)$ and $X_3(t)$ are respectively three updated position values after the t-th lower-order position value is updated based on the three t-th higher-order position values, and $X_P(t)$ is the t-th position average value.

8. The generating method of the wideband reconfigurable intelligent surface of claim 6, wherein the adjusting procedure conforms to the following equation:

$$A = 2a \cdot r_1 - a;$$
$$C = 2 \cdot r_2;$$

wherein a is the t-th decreasing parameter and decreases from 2 to 0 as the number of iterations increases, both of $r_1$ and $r_2$ are random numbers between [0,1], A and C are respectively the two t+1-th iteration parameters.

9. The generating method of the wideband reconfigurable intelligent surface of claim 1, wherein the optimization algorithm is a grey wolf optimization (GWO) algorithm.

10. A generating system of a wideband reconfigurable intelligent surface, comprising:

a memory storing an electromagnetic simulation software, an adaptability function and an optimization algorithm; and a processor electrically connected to the memory and implementing a generating method of the wideband reconfigurable intelligent surface comprising:

executing the electromagnetic simulation software to generate a plurality of reconfigurable reflective units with a plurality of metal patterns by the processor;

executing the electromagnetic simulation software to simulate the reconfigurable reflective units to obtain a plurality of reflection characteristic simulation values corresponding to the metal patterns by the processor;

calculating the reflection characteristic simulation values according to the adaptability function to obtain a plurality of adaptability values corresponding to the metal patterns by the processor;

calculating the adaptability values according to the optimization algorithm to obtain an optimized adaptability value by the processor, wherein the optimal adaptability value corresponds to an optimized metal pattern data; and importing the optimized metal pattern data into the electromagnetic simulation software to generate a plurality of optimized reconfigurable reflective units and forming the wideband reconfigurable intelligent surface based on the optimized reconfigurable reflective units by the processor, wherein the optimized reconfigurable reflective units are the same as each other.

11. The generating system of the wideband reconfigurable intelligent surface of claim 10, wherein each of the reflection characteristic simulation values comprises a first reflection loss and a first reflection phase of each of the reconfigurable reflective units operating in a first reflection state and a second reflection loss and a second reflection phase of each of the reconfigurable reflective units operating in a second reflection state, the processor calculates the first reflection loss and the second reflection loss corresponding to each of the metal patterns according to a loss adaptability function of the adaptability function to obtain a loss adaptability value, the processor calculates the first reflection phase and the second reflection phase corresponding to each of the metal patterns according to a phase adaptability function of the adaptability function to obtain a phase adaptability value, and the processor utilizes a first weight and a second weight to perform a weighted calculation on the loss adaptability value and the phase adaptability value respectively to obtain each of the adaptability values corresponding to each of the metal patterns.

12. The generating system of the wideband reconfigurable intelligent surface of claim 11, wherein each of the reconfigurable reflective units comprises a metal layer, the metal layer comprises a first metal element, a second metal element and a variable capacitance element electrically connected between the first metal element and the second metal element, the processor executes the electromagnetic simulation software to apply a first reverse voltage to the variable capacitance element to cause each of the reconfigurable reflective units to operate in the first reflection state, and the processor executes the electromagnetic simulation software to apply a second reverse voltage to the variable capacitance element to cause each of the reconfigurable reflective units to operate in the second reflection state.

13. The generating system of the wideband reconfigurable intelligent surface of claim 11, wherein the loss adaptability function conforms to the following equation:

$$f_1 = \sum_{n=1}^{N} \left[ (RL_{on,n} - 3)^2 + (RL_{off,n} - 3)^2 \right];$$

wherein N is a number of frequency points that each of the reconfigurable reflective units operates within a target bandwidth range, n is a positive integer, $RL_{on}$ is the first reflection loss, $RL_{off}$ is the second reflection loss, and $f_1$ is the loss adaptability value.

14. The generating system of the wideband reconfigurable intelligent surface of claim 11, wherein the phase adaptability function conforms to the following equation:

$$f_2 = \sum_{n=1}^{N} (\text{mod}((|\text{Phase}_{on,n} - \text{Phase}_{off,n}|, 360°)) - 180°);$$

wherein mod is a modulo operation, N is a number of frequency points that each of the reconfigurable reflective units operates within a target bandwidth range, n is a positive integer, $\text{Phase}_{on}$ is the first reflection phase, $\text{Phase}_{off}$ is the second reflection phase, and $f_2$ is the phase adaptability value.

15. The generating system of the wideband reconfigurable intelligent surface of claim 10, wherein the processor initializes the adaptability values according to the optimization algorithm, the processor initializes an initial decreasing parameter and two initial iteration parameters of the optimization algorithm and sets a maximum number of iterations, the processor executes an optimizing procedure according to the optimization algorithm, and the optimizing procedure is executed to implement the following steps:

selecting three position values corresponding to top-three rankings among a plurality of t-th adaptability values as three t-th higher-order position values, and setting a remaining part of position values corresponding to a remaining part of the t-th adaptability values as a t-th lower-order position value by the processor;

calculating the three t-th higher-order position values and the t-th lower-order position value according to an updating procedure and two t-th iteration parameters to replace the t-th lower-order position value with a t-th position average value by the processor;

generating a plurality of t+1-th adaptability values based on the t-th position average value and the three t-th higher-order position values, and reordering the t+1-th adaptability values and selecting the highest ranking among the t+1-th adaptability values by the processor;

adjusting the two t-th iteration parameters to two t+1-th iteration parameters according to an adjusting procedure and a t-th decreasing parameter by the processor; and setting t to t+1 and confirming whether t+1 is greater than the maximum number of iterations by the processor, where t is a number of iterations;

wherein in response to determine that t+1 is less than or equal to the maximum number of iterations, the processor re-executes the optimizing procedure;

wherein in response to determine that t+1 is greater than the maximum number of iterations, the processor determines that the highest ranking among the t+1-th adaptability values is the optimized adaptability value, and a position value corresponding to the optimized adaptability value comprises the optimized metal pattern data.

16. The generating system of the wideband reconfigurable intelligent surface of claim 15, wherein the updating procedure conforms to the following equation:

$$\begin{cases} D_\alpha(t) = |C \cdot X_\alpha(t) - X(t)| \\ D_\beta(t) = |C \cdot X_\beta(t) - X(t)| \; ; \\ D_\delta(t) = |C \cdot X_\delta(t) - X(t)| \end{cases}$$

$$\begin{cases} X_1(t) = X_\alpha(t) - A \cdot D_\alpha(t) \\ X_2(t) = X_\beta(t) - A \cdot D_\beta(t) \; ; \\ X_3(t) = X_\delta(t) - A \cdot D_\delta(t) \end{cases}$$

-continued $$X_P(t) = \frac{[X_1(t) + X_2(t) + X_3(t)]}{3};$$

wherein A and C are respectively the two t-th iteration parameters and both of A and C are coefficients, $X_\alpha(t)$, $X_\beta(t)$ and $X_\delta(t)$ is the three t-th higher-order position values, $D_\alpha(t)$, $D_\beta(t)$ and $D_\delta(t)$ are respectively three position distance values between the t-th lower-order position value and the three t-th higher-order position values, $X_1(t)$, $X_2(t)$ and $X_3(t)$ are respectively three updated position values after the t-th lower-order position value is updated based on the three t-th higher-order position values, and $X_P(t)$ is the t-th position average value.

17. The generating system of the wideband reconfigurable intelligent surface of claim 15, wherein the adjusting procedure conforms to the following equation:

$$A = 2a \cdot r_1 - a;$$

$$C = 2 \cdot r_2;$$

wherein a is the t-th decreasing parameter and decreases from 2 to 0 as the number of iterations increases, both of $r_1$ and $r_2$ are random numbers between [0,1], A and C are respectively the two t+1-th iteration parameters.

18. The generating system of the wideband reconfigurable intelligent surface of claim 10, wherein the optimization algorithm is a grey wolf optimization (GWO) algorithm.

\* \* \* \* \*